(12) United States Patent
Arbuckle

(10) Patent No.: US 6,640,530 B1
(45) Date of Patent: Nov. 4, 2003

(54) HARVESTER WITH COOPERATING BRUSHES AND COMBS

(76) Inventor: Lee Arbuckle, 1745 Golden Blvd., Billings, MT (US) 59102

( * ) Notice: Subject to any disclaimer, the term of this patent is extended or adjusted under 35 U.S.C. 154(b) by 0 days.

(21) Appl. No.: 09/771,492

(22) Filed: Jan. 26, 2001

(51) Int. Cl.$^7$ ............................................... A01D 45/30
(52) U.S. Cl. ...................................................... 56/130
(58) Field of Search ................................ 56/11.9, 12.4, 56/12.5, 28, 33, 34, 126, 127, 128, 129, 130

(56) References Cited

U.S. PATENT DOCUMENTS

| | | | | |
|---|---|---|---|---|
| 2,715,809 A | * | 8/1955 | Buell | 56/28 |
| 3,017,735 A | * | 1/1962 | Jordan et al. | 56/128 |
| 3,945,179 A | * | 3/1976 | Listov et al. | 56/28 |
| 3,955,346 A | * | 5/1976 | Coon | 56/28 |
| 4,373,322 A | * | 2/1983 | Beisel | 56/126 |
| 4,679,386 A | * | 7/1987 | Lundahl et al. | 460/123 |
| 4,738,087 A | * | 4/1988 | Lundahl | 56/126 |
| 4,796,322 A | * | 1/1989 | Steed et al. | 15/79.2 |
| 4,815,261 A | * | 3/1989 | Anderson | 56/126 |
| 4,951,453 A | * | 8/1990 | Klinner | 56/16.4 R |
| 5,287,685 A | * | 2/1994 | Morgan | 56/126 |
| 5,372,002 A | * | 12/1994 | Collicutt | 56/128 |
| 5,419,107 A | * | 5/1995 | Shelbourne et al. | 56/13.5 |
| 5,557,912 A | * | 9/1996 | Voss et al. | 56/130 |
| 5,678,397 A | * | 10/1997 | Shelbourne et al. | 460/94 |
| 5,974,772 A | * | 11/1999 | Chuksin et al. | 56/128 |
| 6,148,594 A | * | 11/2000 | Heaton et al. | 56/28 |

* cited by examiner

*Primary Examiner*—Thomas B. Will
*Assistant Examiner*—Nathan Mammen

(57) ABSTRACT

A harvester includes a brush assembly having a plurality of flexible, radial bristles extending from a central axis of the brush assembly. The brush assembly is adapted and constructed for rotation in a first direction. A comb assembly having a plurality of axially extending combs mounted in a position spaced radially from and parallel to a central axis of the comb assembly is also provided. The comb assembly is adapted and constructed for rotation in a direction opposite to the direction of rotation of the brush assembly. A mounting assembly secures the brush assembly and the comb assembly such that the bristles of the brush assembly come into contact with the combs of the comb assembly when the brush assembly and the comb assembly are rotating. A method of harvesting of grass seeds while minimizing damage to the standing grass from which the seed is harvested is also disclosed.

20 Claims, 2 Drawing Sheets

HARVESTER WITH COOPERATING BRUSHES AND COMBS

FIELD OF THE INVENTION

The present invention relates generally to the harvesting of grasses. Specifically, the present invention relates to the harvesting of grass seeds while minimizing damage to the standing grass from which the seed is harvested.

BACKGROUND OF THE INVENTION

The selection of crops for propagation has historically been approached in myriad ways, many of which have been less than scientific. For example, early settlers of the western regions of the United States would often plant the same feed crops that they knew to be successful in their native lands. Unfortunately for such settlers, the climatic conditions and precipitation encountered in places like eastern Montana are radically different from those present in western Europe, frequently leading to disappointment or disaster for the unwary homesteader.

More recently, attention has been directed to grasses and other vegetation that is native to the region of interest or, alternatively, native to regions with similar growing conditions. This has led to growing interest in harvesting the seeds of such plants, frequently grasses, both for feed crops and for restoration of native prairie.

As has been recognized in the art, many varieties of grass seed are difficult to harvest. Such factors as small seed size, light weight of the seeds, the presence of chaff material associated with the seeds, loose attachment of the seed to the plant, variable seed head height, varying rates of seed maturation, and weeds in the grass crop, all contribute to the problems in harvesting grass seed.

It has been further recognized that conventional swathing and combining equipment designed to cut, swath, thresh and clean cereal grain crops is unsuitable for harvesting grass seed. Such equipment cannot selectively recover the mature seeds from the grass plant, since the entire crop must be cut at one time. Only the seeds which are mature at that time are useful. A considerable amount of the mature grass seed is lost in this harvesting procedure, both from shattering of the seed heads by the wind, from impacting of the seed head by the swather reel's bats, and by falling out of the swath left to dry in the field. Also, the late-maturing seeds are effectively lost.

The harvesting of such crops has been the subject of several patents. For example, U.S. Pat. No. 5,974,772 to Chuksin et al. is directed to a harvester intended to reduce crop wastage and to simplify the design of the combing unit. The essence of the invention lies in the fact that in the combing unit, the teeth of the working combing element are arranged in rows in the direction of travel, and the upper rim of the front wall of the receiving chamber takes the form of resilient teeth whose ends are located between the lateral edges of the teeth of the working combing element; the angle of inclination of the front wall of the receiving chamber to the horizontal plane is greater than the natural slope angle of a heap of cereal, leguminous crops and grass seeds In another example, U.S. Pat. No. 4,951,453 to Klinner shows an apparatus for harvesting crop including a rotor mounted on a movable frame and carrying a succession of transverse combs, each formed of an array of outwardly projecting teeth traverse to the direction of movement of the apparatus through the crop. Each tooth is pointed with side edges diverging away from the distal tip of the tooth. The rotor rotates in the overshot mode and the combs intrude into the crop and gather crop stems between adjacent pairs of teeth and detach grain and grain heads, or other required crop parts, by rubbing or breaking the parts free from the stems. The junction of adjacent teeth preferably has an enlarged aperture to assist stripping and to allow withdrawal of stripped stems. In other embodiments, the teeth may be replaced by a brush-like structure or by rods or other crop engaging elements, backed by plain transverse ribs for collecting and conveying detached crop parts.

U.S. Pat. No. 4,738,087 to Lundahl discusses a mobile vehicle with a forward vertically adjustable header that includes a mechanism for stripping grain from a standing crop as the machine advances while leaving the stem of the crop attached to the soil. The stripping mechanism including a pair of axially transverse vertically offset brush-type rotors having randomly spaced radial bristles, the upper rotor being disposed slightly forwardly of the lower and being driven so that its lower surface moves rearwardly in close proximity to the rearwardly moving upper surface of the lower roller that is driven in the opposite direction from the first rotor. The grain heads on most of the standing crop are disposed between the axes of the rotors, and the grain is stripped as the heads move into the bite between the rotors. A front blower directs a stream of air toward the bite and a rear blower directs a stream of air upwardly to the rear of the lower rotor, to create a lower pressure zone behind the rotors that assist the feeding of stripping material to a collector bin on the vehicle.

U.S. Pat. No. 4,455,814 to Kienholz is directed to a seed harvester for harvesting seeds from a standing crop without cutting the crop. The harvester is particularly designed for harvesting grass seed. The harvester includes a header assembly for stripping from the crop, and a seed separator for drawing the seeds from the header assembly in an air stream and for separating the seeds from the air stream. The header assembly includes a frame assembly having a transverse inlet which communicates with the seed separator. An endless revolving stripping surface is mounted across this transverse opening to contact the seed heads of the crop and strip the mature seeds from the crop. A rotating reel is mounted to rotate parallel to, and above and forwardly of, the seed stripping surface. On rotation, the reel guides the crop into contact with the seed stripping surface and holds it there for a time to permit the seed stripping surface to remove mature seeds from the crop. The seed separator includes a duct, curved between its ends. The duct inlet communicates with the transverse inlet of the header assembly. A blower is provided at the duct outlet to draw seeds in an air stream, from the header assembly and through the duct. Baffles are provided across the curved duct section which, together with the curve in the duct, cause the seeds to move outwardly toward the outer wall of the curved duct section. This achieves partial separation of the seeds from the air stream. To achieve the remainder of the separation, the seed separator includes a seed withdrawal duct in the outer wall of the curved duct section, and a sealed container at the end of the seed withdrawal duct. Air is drawn through the container and the seed withdrawal duct, preferably by the blower, to carry the seeds in an air stream into the container.

U.S. Pat. No. 4,373,322 to Beisel shows a seed harvester including an elongated hollow housing adapted for support from front loader bucket arms mounted on a tractor with the housing extending transversely of the forward end of the tractor. The housing includes an inlet which opens forwardly and downwardly and in which a rotary brush is mounted for advancing against the upper seed bearing ends of grasses. The brush is driven in a direction wherein the lower marginal portion thereof moves forwardly and the brush is effective to strip the seeds from the upper ends of tall grasses and to convey the stripped seeds into the housing where they are separated from the air flow moving through the housing by centrifugal force and collected in a seed collection point from which the seeds are subsequently removed.

While each of these patented devices offers some advantages over conventional swathing and combining equipment, it can be seen that the need exists for a simple, inexpensive, harvester that efficiently harvests seeds from standing crops while leaving unharmed the plants from which the seeds are harvested.

SUMMARY OF THE INVENTION

These and other objects are achieved by providing a harvester including a brush assembly having a plurality of flexible, radial bristles extending from a central axis of the brush assembly. The brush assembly is adapted and constructed for rotation in a first direction. A comb assembly having a plurality of axially extending combs mounted in a position spaced radially from and parallel to a central axis of the comb assembly is also provided. The comb assembly is adapted and constructed for rotation in a direction opposite to the direction of rotation of the brush assembly. A mounting assembly secures the brush assembly and the comb assembly such that the bristles of the brush assembly come into contact with the combs of the comb assembly when the brush assembly and the comb assembly are rotating.

The brush assembly can be provided as a cylindrical brush member having a multiplicity of elongate flexible plastic bristles, which can be fabricated from nylon. The respective comb members can include a bar element having an outer edge, with a plurality of teeth disposed on the outer edge of the bar element. The comb members can be fabricated from suitable material, such as metal or plastic.

A rotation assembly can be secured to the mounting assembly to selectively impart rotation to the brush assembly and the comb assembly. In an embodiment, the rotation assembly is adapted and constructed to impart a faster speed of rotation to the brush assembly than to the comb assembly. The rotation assembly can include at least one orbital hydraulic motor.

The mounting assembly can be provided with a housing member at least partially enclosing the brush member. An exhaust fan assembly can be secured to the housing member to create and maintain negative air pressure in the housing member. The housing member can further define an accumulation chamber adjacent to the brush assembly. A viewing window can provide visual access to the interior of the accumulation chamber. The mounting assembly can include at least one mount to selectively secure the harvester to a vehicle.

The comb assembly can further include a plurality of bat members, corresponding in number to the comb members, mounted between and parallel to the comb members.

A wind screen can be provided on the mounting assembly and at least partially surrounding the comb assembly. The wind screen can include a plurality of flexible flaps secured to a bracket extending from the mounting assembly.

A method of harvesting of grass seeds while minimizing damage to the standing grass from which the seed is harvested is also disclosed. In a first step, a brush assembly having a plurality of flexible, radial bristles extending from a central axis of the brush assembly is provided. A comb assembly having a plurality of axially extending combs mounted in a position spaced radially from and parallel to a central axis of the comb assembly is also provided. The brush assembly and the comb assembly are rotated in opposite directions, then brought into contact with a grass crop to be harvested. The brush assembly and the comb assembly are rotated such that the bristles of the brush assembly come into contact with the combs of the comb assembly when the brush assembly and the comb assembly are rotating, whereby the seed-bearing heads of the standing grass are grasped between the rotating bristles of the brush assembly and the rotating combs of the comb assembly, thereby stripping only mature seeds from the standing grass. The brush assembly can be rotated at a speed of rotation higher than that of a speed of rotation of comb assembly.

The features of the invention believed to be patentable are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE INVENTION

Figure 1:
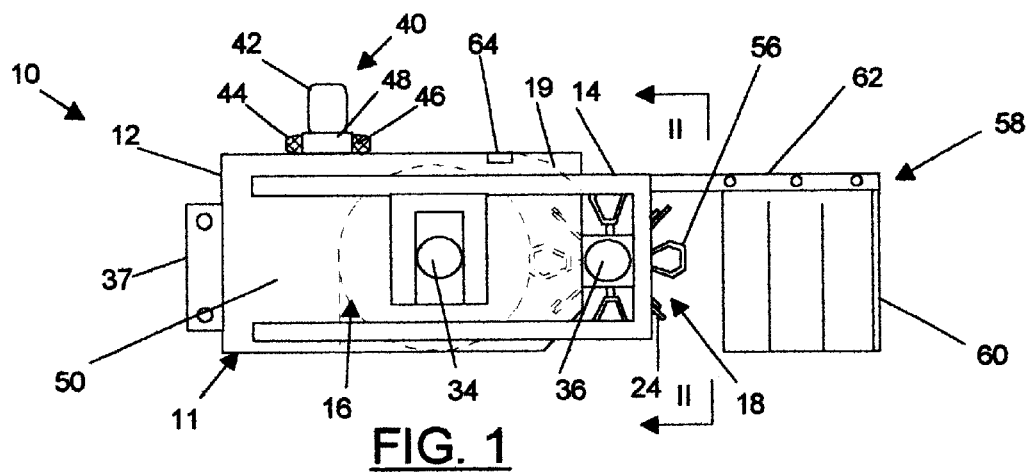
FIG. 1 is a schematic side view of a harvester in accordance with the principles discussed herein.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

A harvester 10 constructed in accordance with the principles of the present invention is shown in FIG. 1. The harvester 10 includes a mounting assembly 11 including a housing 12 and a frame 14. The housing 12 and the frame 14 can be fabricated from any suitable material, such as approximately ⅛" plate steel for the housing and 1" square tubular steel for the frame 14. Mounted for rotation on the housing 12 are a brush assembly 16 and a comb assembly 18. The housing 12 includes an angled wall 19 spanning the front face of the housing 12 above the comb assembly 18. The clearance between the comb assembly 18 and the angled wall 19 is adjustable. It has been found that a clearance of approximately ¼" provides adequate clearance while acting to retain seed harvested within the housing 12.

The brush assembly 16 includes a plurality of flexible, radial bristles 20 extending from a central axis 22 of the brush assembly 16. The bristles 20 can be provided as a multiplicity of elongate flexible plastic bristles, which can be fabricated from any suitable flexible and durable material. It has been found that nylon bristles having a length of approximately 8", in a density of approximately 40 bristles per square inch, provide particular advantages.

The comb assembly 18 includes a plurality of axially extending combs 24 mounted in a position spaced radially from and parallel to a central axis 26 of the comb assembly 18. The respective comb 24 can include a bar element 28 having an outer edge 30, with a plurality of teeth 32 disposed on the outer edge of the bar element. The precise configuration of the teeth 32 can vary to optimize harvesting of different grains under different conditions, as is known in the art. The comb members can be fabricated from suitable material, such as metal or plastic. It has been found that combs machined from stainless steel provide suitable strength and durability.

Rotation mechanisms 34, 36 are provided to rotate the brush assembly 16 and the comb assembly 18 in opposite directions. Here, the rotation mechanisms 34, 36 are provided as orbital hydraulic motors. The motors can be connected to the hydraulic system of a vehicle (not shown) to which the harvester 10 is attached via a pair of mounts 37. In the illustrated embodiment viewed as in FIG. 1, the brush assembly 16 is rotated in a counterclockwise direction, and the comb assembly 18 is rotated in a clockwise direction. It has been found that desirable results are achieved when the comb assembly 18 is rotated at a speed slightly greater than the ground speed of the vehicle to which the harvester is mounted, while the brush assembly 16 is rotated at a faster speed.

The brush assembly 16 and the comb assembly 18 are mounted for rotation using bearings 38, in positions such that the bristles 20 of the brush assembly 16 come into contact with the combs 24 of the comb assembly 18 when the brush assembly 16 and the comb assembly 18 are rotating.

Figure 2:
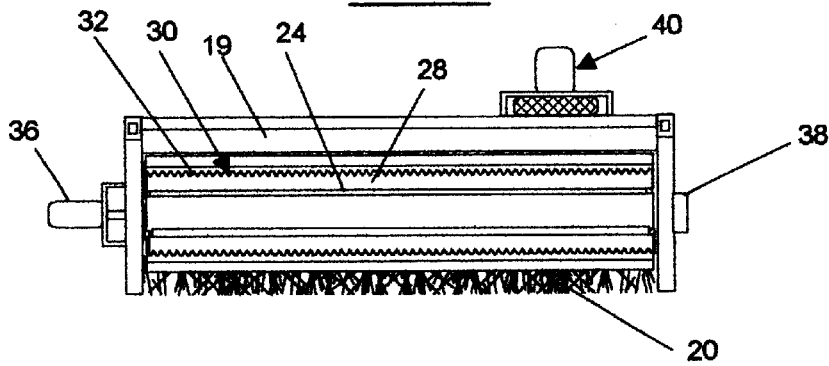
FIG. 2 is a section taken generally along lines 11—11 of FIG. 1.
Figure 3:
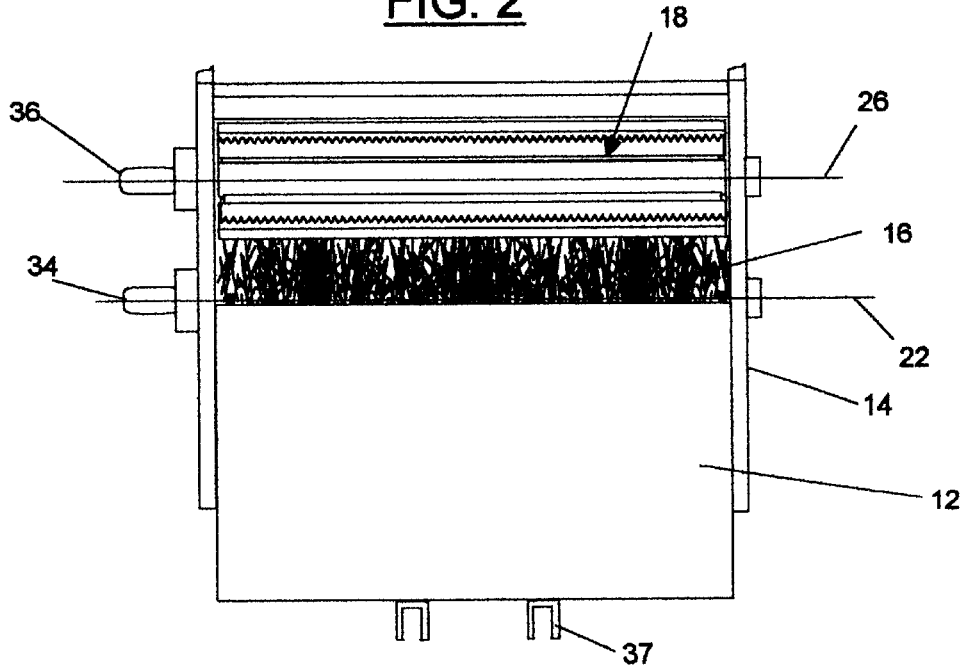
FIG. 3 is a bottom plan view of the harvester illustrated in FIG. 2.
Figure 4:
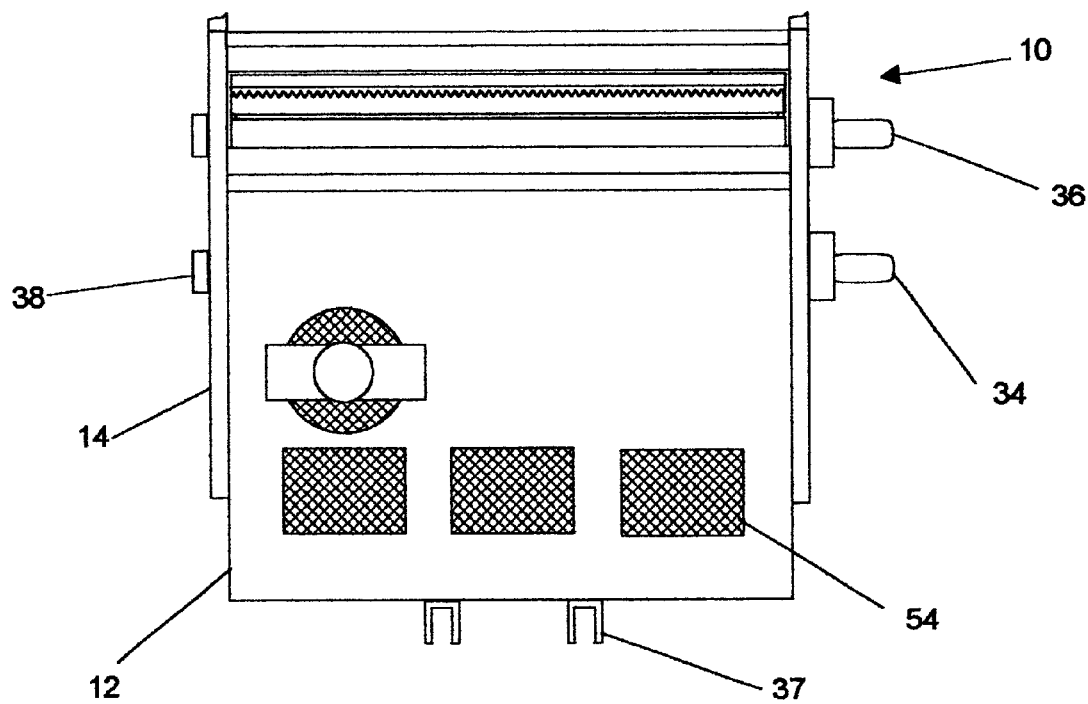
FIG. 4 is a top plan view of the harvester illustrated in FIG. 2.
Figure 5:
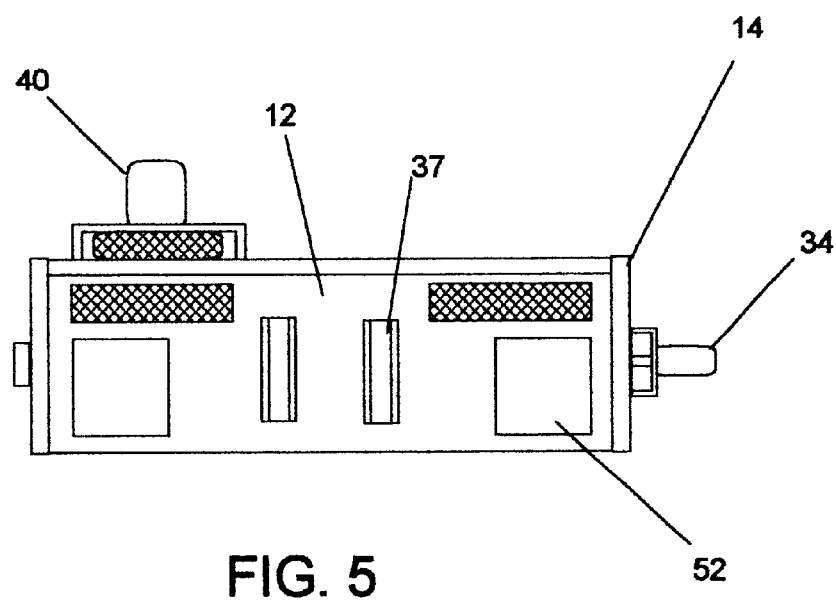
FIG. 5 is a rear elevational view of the harvester illustrated in FIG. 2.

As seen in FIGS. 1–3, the housing 12 at least partially encloses the brush assembly 16. The bottom of the brush assembly 16 is exposed to the standing crop, as shown in FIG. 3.

An exhaust fan assembly 40 is secured to the housing 12 to create and maintain negative air pressure in the housing 12 during operation of the harvester 10. The fan assembly 40 includes a fan motor 42 driving a plurality of fan blades 44, which are enclosed in a fan housing 46. The fan assembly 40 is secured to the housing 12 via a mounting bracket 48.

The housing 12 defines an accumulation chamber 50 adjacent to the brush assembly 16. One or more viewing windows 52 can provide visual access to the interior of the accumulation chamber 50. A plurality of screened apertures 54 provide ventilation to the interior of the accumulation chamber 50, and assist in maintaining negative air pressure therein.

The comb assembly 16 can further include a plurality of bat members 56, corresponding in number to the comb members 24, mounted between and parallel to the comb members 24. The bat members 56 are configured similarly to those on known swathers, and provide additional guidance and support to standing crop as it is harvested by the interaction of the brush and combs.

A wind screen 58 can be provided on the mounting assembly 11 at least partially surrounding the comb assembly 18.

The wind screen 58 can include a plurality of flexible flaps 60 secured to a bracket 62 extending from the mounting assembly 11. The windscreen 58 reduces the effect of ambient wind and machine-induced turbulence on the standing crop, allowing the crop to stand upright and thus increasing yields.

A flow sensor 64 is provided within the interior of the accumulation chamber 50 to monitor the amount of seeds entering the chamber. The flow sensor can be provided as an infrared sensor. The tilt, height, speed of rotation can then be adjusted to maximize seed flow. It is also contemplated that output from the sensor could be used in a computerized control system, along with other parameters such as humidity, windspeed, and crop ripeness, to determine optimal values for parameters such as harvester tilt, height above the ground, speed of brush and comb rotation, and vehicle speed. Such values could be used to automatically control the vehicle, as is known in the art, to optimize harvest conditions.

In operation, the harvester 10 is secured to a vehicle such as a tractor having front end loader mounting arms. The mounts 37 are secured to the loader arms, and the rotation mechanisms 34, 36 and the fan assembly 40 are connected to motive power, such as the tractor hydraulic system. The brush assembly 16 and the comb assembly 18 are then caused to rotate in opposite directions, then brought into contact with a grass crop to be harvested. The brush assembly 16 and the comb assembly 18 are rotated such that the bristles 20 of the brush assembly 16 come into contact with the combs 24 of the comb assembly 18 when the brush assembly 16 and the comb assembly 18 are rotating. This causes the seed-bearing heads of the standing grass to be grasped between the rotating bristles of the brush assembly and the rotating combs of the comb assembly. The interaction of the bristles of the brushes with the teeth of the combs exerts an optimal harvesting force on the seeds, thereby stripping only mature seeds from the standing grass. The standing crop remains relatively undamaged, leaving the immature seeds on the stalk to be harvested when they have ripened.

Although the present invention has been described with reference to specific embodiments, those of skill in the art will recognize that changes may be made thereto without departing from the scope and spirit of the invention as defined by the appended claims.

What is claimed is:

1. A harvester for removing seeds from a standing crop, the harvester comprising the following:

a brush assembly having a plurality of flexible, radial bristles extending from a central axis of the brush assembly, the brush assembly being adapted and constructed for rotation in a first direction;

a comb assembly having a plurality of axially extending combs mounted in a position spaced radially from and parallel to a central axis of the comb assembly, the comb assembly being adapted and constructed for rotation in a direction opposite to the direction of rotation of the brush assembly; and a mounting assembly adapted and constructed to secure the brush assembly and the comb assembly such that the bristles of the brush assembly come into contact with the combs of the comb assembly when the brush assembly and the comb assembly are rotating;

whereby cooperation of the brush assembly and comb assembly remove only mature seeds from the crop, leaving the standing crop undamaged.

2. A harvester according to claim 1, wherein the brush assembly comprises a cylindrical brush member.

3. A harvester according to claim 2, wherein the cylindrical brush member comprises a multiplicity of elongate flexible plastic bristles.

4. A harvester according to claim 3, wherein the flexible plastic bristles of the brush assembly are fabricated from nylon.

5. A harvester according to claim 1, wherein each of the respective comb members of the comb assembly comprises the following:
   a bar element having an outer edge; and
   a plurality of teeth disposed on the outer edge of the bar element.

6. A harvester according to claim 5, wherein each of the respective comb members of the comb assembly is fabricated from a material selected from a group consisting of metal and plastic.

7. A harvester according to claim 1, further comprising a rotation assembly secured to the mounting assembly, the rotation assembly being adapted and constructed to selectively impart rotation to the brush assembly and the comb assembly.

8. A harvester according to claim 7, wherein the rotation assembly is adapted and constructed to impart a faster speed of rotation to the brush assembly than to the comb assembly.

9. A harvester according to claim 7, wherein the rotation assembly comprises at least one orbital hydraulic motor.

10. A harvester according to claim 1, wherein the mounting assembly comprises a housing member at least partially enclosing the brush member.

11. A harvester according to claim 10, further comprising an exhaust fan assembly secured to the housing member, the exhaust fan assembly being adapted and constructed to create and maintain negative air pressure in the housing member.

12. A harvester according to claim 10, wherein the housing member defines an accumulation chamber adjacent to the brush assembly.

13. A harvester according to claim 12, further comprising a viewing window providing visual access to the interior of the accumulation chamber.

14. A harvester according to claim 1, wherein the mounting assembly comprises at least one mount adapted and constructed to selectively secure the harvester to a vehicle.

15. A harvester according to claim 1, wherein the comb assembly further comprises a plurality of bat members, corresponding in number to the comb members, mounted between and parallel to the comb members.

16. A harvester according to claim 1, further comprising a wind screen secured to the mounting assembly and at least partially surrounding the comb assembly.

17. A harvester according to claim 16, wherein the wind screen comprises a plurality of flexible flaps secured to a bracket extending from the mounting assembly.

18. A harvester for removing seeds from a standing crop, the harvester comprising the following:
   a brush assembly having a plurality of flexible, radial bristles extending from a central axis of the brush assembly, the brush assembly being adapted and constructed for rotation in a first direction;
   a comb assembly having a plurality of axially extending combs mounted in a position spaced radially from and parallel to a central axis of the comb assembly, the comb assembly being adapted and constructed for rotation in a direction opposite to the direction of rotation of the brush assembly;
   a mounting assembly adapted and constructed to secure the brush assembly and the comb assembly such that the bristles of the brush assembly come into contact with the combs of the comb assembly when the brush assembly and the comb assembly are rotating;
   a rotation assembly adapted and constructed to impart a faster speed of rotation to the brush assembly than to the comb assembly; and
   a wind screen secured to the mounting assembly and at least partially surrounding the comb assembly;
   whereby cooperation of the brush assembly and comb assembly remove only mature seeds from the crop, leaving the standing crop undamaged.

19. A method of harvesting of grass seeds while minimizing damage to the standing grass from which the seed is harvested, the method comprising the following steps:
   providing a brush assembly having a plurality of flexible, radial bristles extending from a central axis of the brush assembly, the brush assembly being adapted and constructed for rotation in a first direction;
   providing a comb assembly having a plurality of axially extending combs mounted in apposition spaced radially from and parallel to a central axis of the comb assembly, the comb assembly being adapted and constructed for rotation in a direction opposite to the direction of rotation of the brush assembly;
   bringing the brush assembly and the comb assembly into contact with a grass crop to be harvested; and
   rotating the brush assembly and the comb assembly such that the bristles of the brush assembly come into contact with the combs of the comb assembly when the brush assembly and the comb assembly are rotating, whereby the seed-bearing heads of the standing grass are grasped between the rotating bristles of the brush assembly and the rotating combs of the comb assembly, thereby stripping only mature seeds from the standing grass.

20. A method according to claim 19, wherein the step of rotating the brush assembly and the comb assembly comprises rotating the brush assembly at a speed of rotation higher than that of a speed of rotation of comb assembly.

* * * * *